United States Patent [19]

Blamoutier et al.

[11] 4,369,465
[45] Jan. 18, 1983

[54] PROCESS AND DEVICE FOR SUPPRESSING INTERFERENCES IN A PICTURE COMPOSED OF ELECTRONICALLY GENERATED IMAGE POINTS

[75] Inventors: Michel Blamoutier; Jean Fraleux, both of Paris, France

[73] Assignee: Thomson-CSF, Paris, France

[21] Appl. No.: 196,732

[22] PCT Filed: Oct. 11, 1978

[86] PCT No.: PCT/FR78/00031

§ 371 Date: Jun. 11, 1979

§ 102(e) Date: Jun. 8, 1979

[30] Foreign Application Priority Data

Oct. 11, 1977 [FR] France ............... 77 30532

[51] Int. Cl.³ ............................................. H04N 5/21
[52] U.S. Cl. ................................................... 358/167
[58] Field of Search .............. 358/160, 163, 167, 280, 358/284, 166, 36; 364/515; 340/146, 3 AG

[56] References Cited

U.S. PATENT DOCUMENTS 3,979,555 9/1976 Opittek .............................. 358/166
3,983,320 9/1976 Ketcham et al. ................... 358/166

*Primary Examiner*—John C. Martin

*Attorney, Agent, or Firm*—Karl F. Ross

[57] ABSTRACT

In order to suppress interferences in the display of a picture composed of electronically generated image points or dots, such as that of a television receiver, luminance signals determining the brightness of dots occupying adjacent positions in the picture are compared and are modified in the presence of excessive contrasts before being fed to a brightness-control electrode of a cathode-ray tube. When a given luminance signal $S(i,j)$, pertaining to an image point $P(i,j)$ where $i$ indicates the order number of a line in a scanning frame and $j$ indicates the position of the point in that line, differs in absolute value by more than a predetermined threshold from a corresponding signal $S(i-k,j-p)$ pertaining to at least one adjacent image point $P(i-k,j-p)$, where $k$ and $p$ may have values $\pm 1$ or 0, the signal $S(i,j)$ is replaced by the signal $S(i-k,j-p)$ incremented or decremented by a corrective signal $Sc$ of predetermined magnitude, depending on whether signal $S(i,j)$ is larger or smaller than signal $S(i-k,j-p)$. The magnitude of the corrective signal $Sc$ may be equal to the most frequently occurring contrast between adjacent image points according to a histogram which is either statistically predetermined or stored in a frame memory on the basis of quasi-instantaneous calculations performed on the actual signal levels.

9 Claims, 6 Drawing Figures

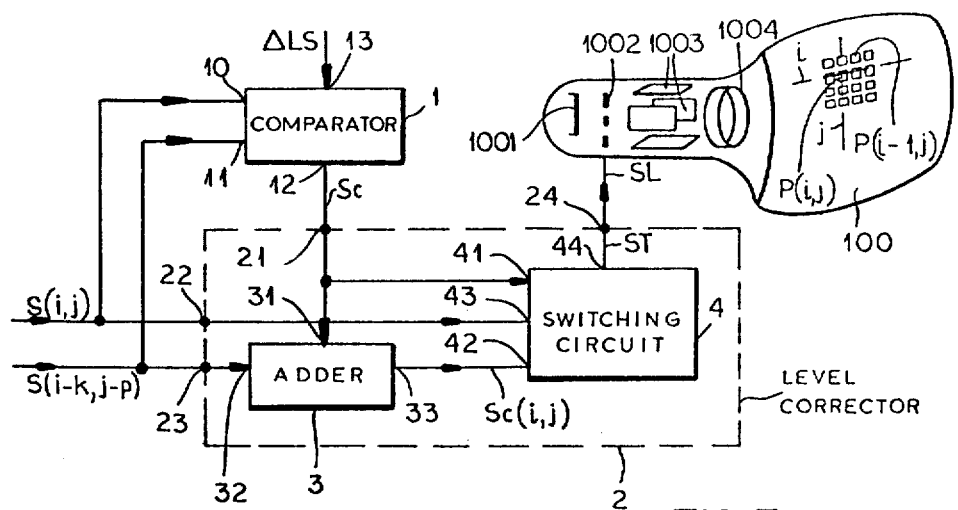
FIG.3
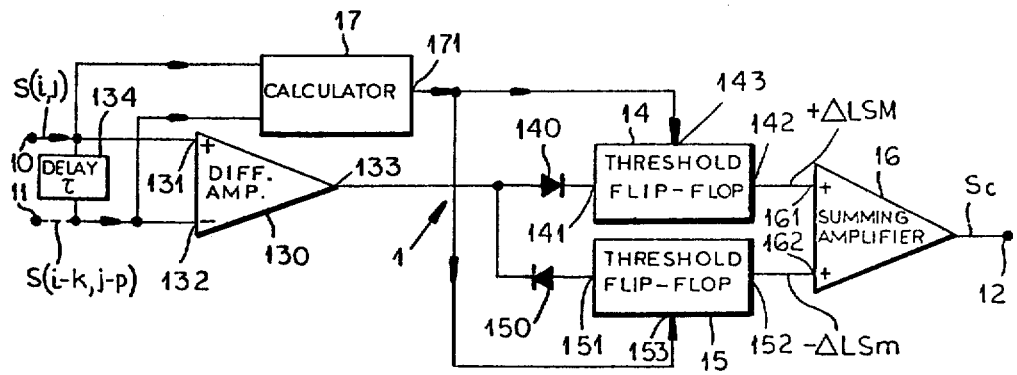
FIG.4a
FIG.4b
FIG.4c

PROCESS AND DEVICE FOR SUPPRESSING INTERFERENCES IN A PICTURE COMPOSED OF ELECTRONICALLY GENERATED IMAGE POINTS

FIELD OF THE INVENTION

Our present invention relates to a process and a device for suppressing interferences from spurious signals in a display system wherein pictures are composed of electronically generated image points in the form of luminous dots of different brightness.

BACKGROUND OF THE INVENTION

In such display systems, the pictures are defined on a viewing screen by an assembly of dots projected thereon by an electron beam whose intensity is controlled by a luminance signal of variable level. With television-type screen scanning for example, the location of a dot is given by an address $P(i,j)$ in which i represents the order of a scanning line and j the position of the considered dot in that line. Associated with each impage point $P(i,j)$ is a luminance signal of level $S(i,j)$ normally specifying the brightness of a dot of given dimensions known in the art by the term "pixel".

The pictures obtained in this type of display system are subject to certain defects due to the existence of spurious phenomena interfering with the luminance signals. Known techniques permit the elimination of certain image defects if the latter are identified without ambiguity, that is to say in practice if their level is invariable and known. This is for example the case with mono-ionic or ionizing-particle noise in an image-intensifying-tube circuit and with interferences producing a black or a white dot in a vidicon tube. These techniques utilize the prior knowledge of the shape of the curve of the luminance histogram of the picture, the curve showing along the ordinate the number of dots of a given brightness level. The conventional way of interference suppression consists in replacing the luminance signal of any dot whose level is equal to or higher than the level of the interfering signal by a signal of the most probable level of the picture. This process is the more effective the narrower the histogram, i.e. the smaller the typical deviation of the number of dots along the curve from a peak representing the most probable brightness level. Still, there are drawbacks in particular if the interferences to be eliminated are in a range of very improbable levels. These dots consequently carry a great amount of information, in the statistical sense of the term, and their suppression results in a loss of overall information. This loss of information can only be evaluated with knowledge of the subjective degree of interest shown by the observer for the information conveyed by the image points subjected to this leveling procedure. Thus, if the level of the luminance signal of the spot to be eliminated is in the domain of brightness of the particular details looked for in the picture by the observer, the elimination of these levels by the aforementioned process in fact renders the corrected picture irrelevant.

OBJECT OF THE INVENTION

The object of our present invention is to provide an interference-suppressing process and device obviating the drawbacks referred to.

SUMMARY OF THE INVENTION

A process according to our invention, designed to suppress interferences in the display of a picture whose image points are electronically generated luminous dots projected onto a viewing screen such as that of a cathode-ray tube in a predetermined pattern of consecutive line scans, involves a comparison of two luminance signals whose levels determine the brightness of a given image point $P(i,j)$ and of at least one adjacent image point $P(i-k,j-p)$ where i indicates the order number of a scanning line and j indicates the dot position in that line. Thus, in a first step of our process, a luminance signal $S(i,j)$ pertaining to image point $P(i,j)$ is compared with a luminance signal $S(i-k,j-p)$ pertaining to an adjacent image point or dot; the level of signal $S(i-k,j-p)$ could also be the mean of the levels of luminance signals pertaining to several such adjacent dots. In order to define an adjacent dot, indices k and p may have any of the values $+1$, 0 and $-1$ except that, of course, the case $k=p=0$ must be excluded.

If the comparison reveals a level difference between signals $S(i,j)$ and $S(i-k,j-p)$ whose absolute value does not exceed a predetermined threshold, the unchanged signal $S(i,j)$ is used to control the brightness of the associated image point $P(i,j)$. If the level difference $S(i,j) - S(i-k,j-p)$ is found to have a positive value exceeding a predetermined threshold, the adjacent-dot signal $S(i-k,j-p)$ is incremented by a corrective signal Sc of predetermined magnitude $+\Delta LSM$ to produce a resulting signal $Sc(i,j) = S(i-k,j-p) + Sc$ which is then used to control the brightness of image point $P(i,j)$. If, on the other hand, that level difference is negative with an absolute value exceeding the threshold referred to, signal $S(i-k,j-p)$ is decremented by a corrective signal Sc which in this instance has a predetermined magnitude $-\Delta LSm$ to yield a resulting signal $Sc(i,j) = S(i-k,j-p) - |Sc|$ for use to control the brightness of image point $P(i,j)$. The two corrective values $+\Delta LSM$ and $-\Delta LSm$ are preferably chosen in the vicinity of peaks of a histogram curve representing the frequency of occurrence of different brightness contrasts of adjacent image points or dots.

A device according to our invention, designed to suppress interferences in the form of spurious signals tending to impair the quality of a picture displayed with the aid of intensity-control means acting upon an electron beam, comprises comparison means with inputs connected to a source of first and second luminance signals $S(i,j)$ and $S(i-k,j-p)$ for generating the corrective signal Sc, adding means with inputs connected to that source and to the comparison means for algebraically summing the second luminance signal $S(i-k,j-p)$ with the corrective signal Sc to produce the resulting signal $Sc(i,j)$, and switching means controlled by the comparison means for supplying the intensity-control means with the first luminance signal $S(i,j)$ in the absence of the corrective signal Sc and with the resulting signal $Sc(i,j)$ in the presence of that corrective signal.

The device and the process according to our invention may be used in any display system in which the picture is represented on the screen of a cathode-ray tube by an assembly of dots as discussed above, in particular in apparatus for radiology and cartography as well as in electron microscopes.

The process and the device of our invention afford an improvement in the quality of the display by a finer correction of the brightness level of each dot with reference to that of at least one adjacent or neighboring dot.

The correction for a considered dot is carried out in a manner conserving the brightness level of such neighboring dot so that the detail represented by the dots involved remains essentially intact.

BRIEF DESCRIPTION OF THE DRAWING

The above and other features of our invention will now be more particularly described with reference to the accompanying drawing in which:

FIG. 3 is an overall block diagram of a device embodying our invention;

FIGS. 4a, 4b and 4c represent respectively a more detailed circuit diagram of one of the blocks of FIG. 3 and waveforms of signals appearing at certain points of this circuit.

SPECIFIC DESCRIPTION

Figure 1:
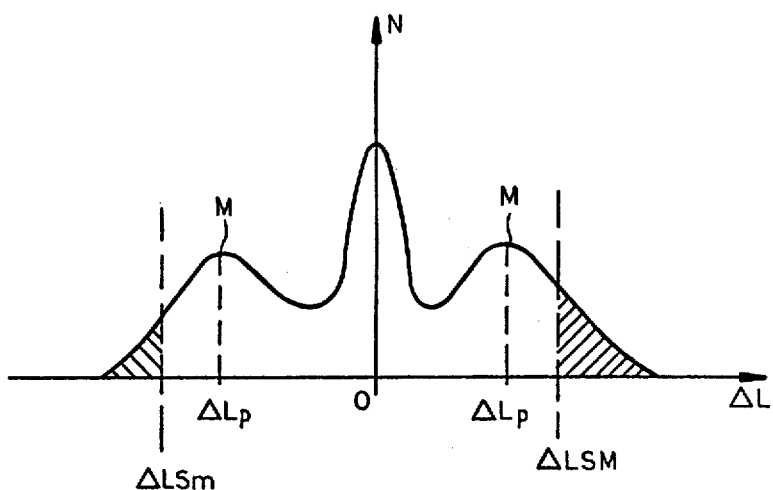
FIG. 1 represents a histogram of brightness differences of adjacent dots in the case of a very contrasted picture, the abscissa axis being graduated symmetrically about an origin O in terms of brightness difference $\Delta L$ while the corresponding number N of dots or pixels is plotted along the ordinate axis.

FIG. 1 represents a histogram of the dot-by-dot brightness differences of a picture produced by an electron beam with television-type line and frame scanning. The picture is defined by an assembly of dots or pixels whose brightness is quantized as a sum of discrete elementary levels.

In FIG. 1, the abscissa gives the difference $\Delta L$ between the levels of the luminance signals for a certain dot $P(i,j)$ and for an adjacent dot $P(i-1,j)$ on an immediately preceding line in the direction of the scanning sweep. This difference ranges from zero to a positive and a negative maximum. The ordinate represents the number N of pairs of dots or pixels for each value of the level difference $\Delta L$. Thus the histogram shown in FIG. 1, relating to a very fine and very contrasted picture comprising many details, has a widespread distribution with a peak for two large differences of luminance $\pm \Delta Lp$. The distribution is substantially symmetrical with respect to the ordinate axis, the chosen direction of analysis determining the positive or negative sign.

As already explained, the process according to our invention involves a comparison of the level of the luminance signal $S(i,j)$ of each considered dot $P(i,j)$ of the picture and the level of the luminance signal $S(i-k,j-p)$ of at least one dot $P(i-k,j-p)$ adjoining the considered dot. The adjacent dot $P(i-k,j-p)$ may for example be an image point of the same line as the dot $P(i,j)$, in which case the index $p=0$, or an image point of a neighboring line in which case p assumes the value $+1$ or $-1$. If the adjoining dot lies on a neighboring line, identified by $p=\pm 1$, the index k may assume the values $0, +1, -1$, thereby defining a group of six adjacent dots (three on each neighboring line). An advantage in the use of dots of neighboring lines Nos. $i\pm 1$ is that their noise is less correlated with that of the considered dot $P(i,j)$ than the noise of the adjacent dots on the line No. i. The described comparison is followed by a phase of correction of the level of the luminance signal for each dot $P(i,j)$ by an algebraic addition of a corrective signal Sc to the luminance signal $S(i-k,j-p)$. This correction yields a resulting signal $Sc(i,j)$. The corrective signal Sc has a level $+\Delta LSM$ when the luminance signal $S(i,j)$ of the considered dot $P(i,j)$ exceeds the luminance signal $S(i-k,j-p)$ of an adjacent dot by more than a given threshold value; when, on the other hand, the luminance signal $S(i-k,j-p)$ exceeds the signal $S(i,j)$ by more than that threshold value, the corrective signal Sc has a level $-\Delta LSm$. The levels $\Delta LSM$ and $\Delta LSm$ of the corrective signal should each have a value corresponding to a particular difference of luminance $\Delta L$ of the histogram so chosen as to give a picture which is satisfactory to the eye according to subjective visual criteria. We prefer to make both levels $\Delta LSM$ and $\Delta LSm$ equal to the same value $\Delta Lp$. In FIG. 1, the numbers of corrected pixels or dots are located in the cross-hatched zones of the histogram, the value $\Delta Lp$ corresponding to a peak of the histogram curve.

Figure 2:
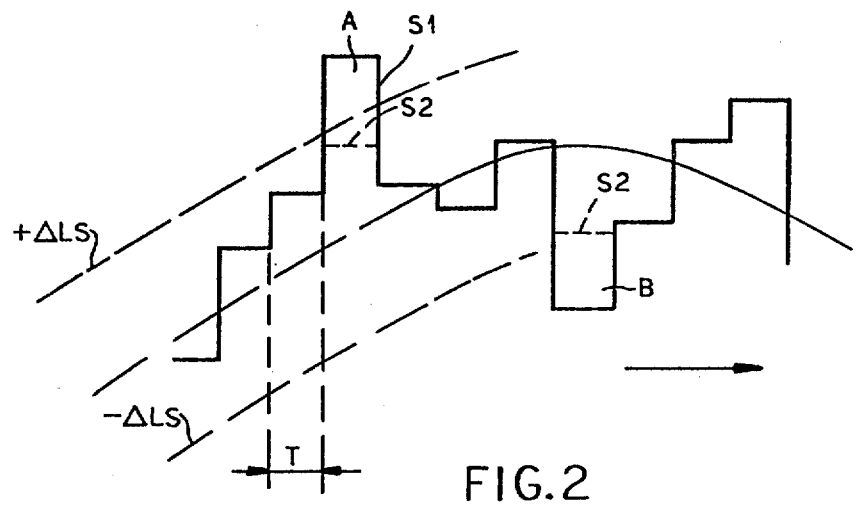
FIG. 2 is a graph representing the level of the luminance signals for a sequence of successive dots on a scanning line of an electronically generated picture.

Interference is suppressed in the manner shown in FIG. 2 where the stepped curve S1, shown in heavy lines, represents a luminance signal affected by disturbances A and B. The luminance level relating to one dot corresponds to a constant video-frequency signal during an elementary time T. The video-frequency signal is for example equal to a sum of discrete elementary levels. The interference-suppression process of our invention operates at the frequency of dot scanning and leaves unchanged the low-contrast dots and levels the signal peaks without, however, causing them to disappear completely as shown at S2 in dotted lines.

We may also compare a given dot $P(i,j)$ with either the highest or the lowest luminance level of the neighboring dots, thereby either increasing or decreasing the amplitude of the corrected signal and the contrast between two pixels after correction.

According to a preferred manner of carrying out the invention, the luminance level of the considered dot $P(i,j)$ is compared with the mean of the luminance levels of the adjacent dots. Such a comparison, by taking into consideration a larger number of reference dots, enables the correction of either a single image point or a cluster of such points.

A choice among the aforedescribed processing modes and a determination of the levels $\Delta LSm$, $\Delta LSM$ for the corrective signal can be made experimentally on the basis of the relative characteristics of the noise and image statistics and according to the subjective interest in the different brightness levels of the picture.

In FIG. 3 we have shown a device according to our invention for a display system comprising a cathode-ray tube 100 on whose screen the picture is represented by an assembly of dots each defined by a luminance signal of given level. In operation, the cathode-ray tube, comprising the conventional elements such as an electron gun 1001, a Wehnelt electrode or grid 1002, reflecting electrodes 1003 for scanning the screen by means of an electron beam, and an acceleration electrode 1004, receives on its control electrode 1002 a luminance signal SL modulating the intensity of the electron beam and the brightness level of each of the dots produced on the screen with television-type scanning. A circuit 1 compares the level of the luminance signal $S(i,j)$ of a considered dot $P(i,j)$ with the level of the luminance signal $S(i-k,j-p)$ of at least one dot $P(i-k,j-p)$ adjacent thereto. The comparator 1 has two inputs 10 and 11 connected to a non-illustrated source respectively delivering to these inputs the luminance signals $S(i,j)$ and $S(i-k,j-p)$. The comparator 1 further has an input 13 for adjusting the threshold $\Delta LS$ and an output 12 delivering a corrective signal Sc to a level corrector, generally designated 2, including an adder 3 and a switching circuit 4. Adder 3 has an input 32 supplied with the luminance signal S(i-k,j-p) through a terminal 23 of unit 2, an input 31 supplied with the corrective signal Sc by another terminal 21 of that unit, and an output 33 delivering a resulting signal Sc(i,j). The switching circuit 4 has a control input 41 connected to comparator output 12 and emits, for the considered dot P(i,j), a treated signal ST appearing on an output 44. With $Sc = +\Delta LSM$, i.e. when $S(i,j) - S(i-k,j-p) > \Delta LS$, the treated signal ST corresponds to the corrective signal $Sc(i,j) = S(i-k,j-p) + \Delta LSM$. With $Sc = -\Delta LSm$, i.e. when $S(i,j) - S(i-k,j-p) < -\Delta LSm$, the treated signal ST corresponds to the corrective signal $Sc(i,j) = S(i-k,j-p) - \Delta LSm$. The levels $\Delta LSM$ and $\Delta LSm$ of the corrective signal each equal a particular value of the luminance deviation $\Delta L$ in the histogram of FIG. 1 and may be determined by a calculator 17 included in comparator 1 as shown in FIG. 4a. In all other instances, $Sc = 0$ and the signal ST corresponds, for the considered dot P(i,j), to the luminance signal S(i,j) pertaining to that dot.

The histogram of FIG. 1 is obtained either by a statistical measurement for a given type of picture or by the calculator 17 which derives from several initial pictures a quasi-instantaneous histogram stored in a frame memory.

Besides its control input 41, supplied with the corrective signal Sc through the terminal 21 of unit 2, switching circuit 4 has a data input 42, connected to the output terminal 33 of adder 3 for receiving the resulting signal Sc(i,j), and a data input 43 supplied with the luminance signal S(i,j) through a terminal 22 of unit 2. The output 44 of switching circuit 4 is connected via a terminal 24 of unit 2 to the control electrode 1002 of the display tube whose intensity-modulating signal SL therefore corresponds to the treated signal ST.

FIGS. 4a and 4b respectively represent a particular embodiment of comparator 1 and a waveform of the corrective signal Sc appearing at the comparator output 12. In FIG. 4a the comparator 1 comprises a differential amplifier 130 with a noninverting input 131 and an inverting input 132 respectively connected to terminal 10 and 11 carrying the luminance signals S(i,j) and S(i-k,j-p). As shown in FIG. 4a, terminal 11 and input 132 are connected to terminal 10 through a lossfree delay element such as a charge-transfer register which transmits the luminance signal S(i,j) with a delay T equal, for example, to the line-scanning duration when the chosen adjacent dot is the image point P(i,j-1) for which k=0 and p=1. Thus, the delayed signal S(i,j) becomes the adjacent-dot signal S(i-k,j-p). Comparator 1 further includes two flip-flops 14 and 15 each having a triggering threshold $\Delta LS$. Flip-flops 14, 15 have respective trigger inputs 141 and 151 connected to the amplifier output 133 through diodes 140 and 150 of opposite polarities. These flip-flops, when triggered, respectively emits a positive voltage level $+\Delta LSM$ on an output 142 and a negative voltage level $-\Delta LSm$ on an output 152. The voltage levels $\Delta LSM$ and $\Delta LSm$ are adjustable by calculator 17 whose output 171 is connected to respective control inputs 143 and 153 of these flip-flops. The comparator further comprises a summing amplifier 16 with two input terminals 161 and 162 respectively connected to the outputs 142 and 152 of flip-flops 14 and 15; amplifier 16 emits on output 12 the corrective signal Sc.

The difference signal $S(i,j) - S(i-k,j-p)$ emitted by amplifier 13 is shown in FIG. 4b; when it is higher than the positive threshold $+\Delta LS$ or lower than the negative threshold $-\Delta LS$, it triggers the flip-flop 14 or 15, respectively. The corresponding voltage level delivered by each flip-flop appears in the output of summing amplifier 16 as the corrective signal Sc shown in FIG. 4c. As will be apparent from FIGS. 4b and 4c, flip-flops 14, 15 are both reset to make $Sc = 0$ when the difference signal $S(i,j) - S(i-k,j-p)$ lies between thresholds $+\Delta LS$ and $-\Delta LS$.

In a preferred embodiment of our invention, the flip-flops 14, 15 respectively deliver when triggered a voltage level of the same absolute magnitude $|\Delta LSM| = |\Delta LSm|$ equal to the value $\Delta Lp$ of the luminance deviation $\Delta L$ corresponding to a maximum M in the histogram of FIG. 1. For this purpose, the respective control inputs 143 and 153 of the flip-flops 14 and 15 receive from calculator 17 an adjusting voltage which is proportional to the value $\Delta Lp$ at peaks M.

Figure 5:
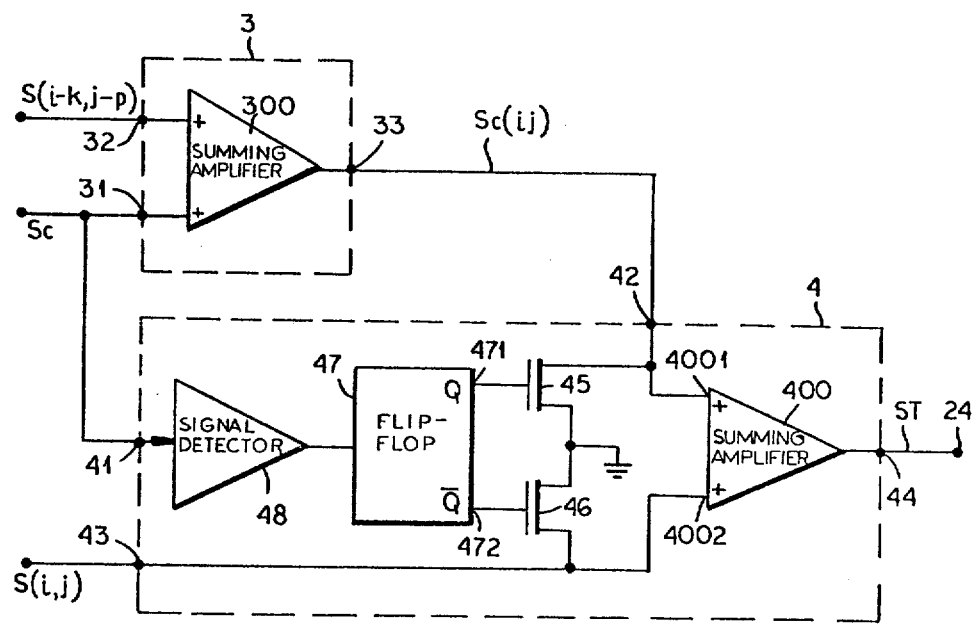
FIGS. 5 and 6 represent details of other blocks of FIG. 3.

In FIG. 5, the adder 3 of the level-correcting unit 2 is shown as a summing amplifier 300 having two inputs respectively supplied with the luminance signal S(i-k,j-p) of an adjacent dot on terminal 32 and with the corrective signal Sc on terminal 31. The summing amplifier 300 emits on output 33 the resulting signal Sc(i,j). The switching circuit 4 is shown in FIG. 5 to comprise another summing amplifier 400 with two inputs 4001 and 4002 respectively connected to the input terminals 42 and 43 of circuit 4 which further comprises a pair of switches 45 and 46 respectively connected between inputs 4001, 4002 and ground. The switching circuit also comprises a signal detector 48 and a flip-flop 47 whose trigger input is connected to the output of component 48 whose own input 41 receives the corrective signal Sc. The flip-flop 47 has a first output 471 connected to the control input of switch 45 and a second output 472 is connected to the control input of switch 46. In operation, each switch closed by the corrective signal Sc grounds the respective input 4001 or 4002 of the summing amplifier 400 whose output 44 is connected to terminal 24 of the level corrector 2 and delivers the treated signal ST which, as described above, equals either the resulting signal Sc(i,j) or the unchanged signal S(i,j).

Figure 6:
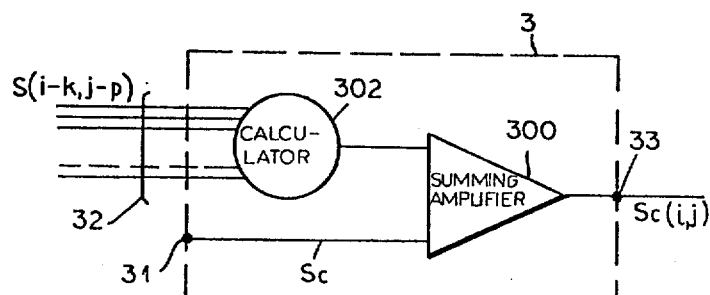

As shown in FIG. 6, adder 3 may include a calculator 302 inserted between terminal 32 and the corresponding input of amplifier 300 for supplying same with liminance-level information of a plurality of adjacent dots P(i-k,j-p). The calculator 302, emitting a signal which represents the mean value of the luminance level of these adjacent dots, may operate digitally in cascade with a digital-to-analog converter; an analog calculator, however, could also be employed.

As already stated, the correction of a given luminance signal could also be effected with the aid of an adjacent-dot luminance signal S(i-k,j-p) of maximum or minimum amplitude. This mode of operation enables a correction of very high and very low luminance values. In this case, the calculator 302 delivers to the associated input of the summing amplifier 300 a signal which is proportional to the maximum or to the minimum luminance level of the dots next to the considered dot P(i,j).

The process and the device according to our invention enable also the effectiveness of the treatment to be modulated by adjusting the maximum allowable luminance deviation $\Delta LSM$, $\Delta LSm$ between two adjacent dots. The values $\Delta LSM$ and $\Delta LSm$ may be modified on the basis of the level of the luminance signal in the case of a picture which has a highly fluctuating noise. Thus, as already noted with reference to FIG. 4a, the calculator 17 delivers to the control inputs 143 and 153 of the flip-flops 14 and 15 a signal altering the level of the corrective signal Sc by a corresponding adjustment of their output signals. In this way it is possible to modulate the level of the corrective signal Sc in light of the knowledge of the histogram of FIG. 1 as discussed above. The calculators 17 and 302, which could be replaced by a microprocessor, may be formed by a single calculating unit.

It will be apparent that our invention enables a reduction of large scintillations of a highly illuminated area according to a law so chosen as to facilitate the observation of contiguous slightly illuminated areas whose relative brightness level is lower than the level of the disturbance of the area involved.

We claim:

1. A process for suppressing interferences in the display of a picture composed of image points in the form of electronically generated luminous dots projected onto a viewing surface in a predetermined pattern of consecutive line scans, the brightness of each dot being determined by the level of a luminance signal, comprising the steps of:

(a) comparing a given luminance signal S(i,j), pertaining to an image point P(i,j) where i indicates the order number of a scanning line and j indicates the dot position in said line, with a luminance signal S(i-k,j-p) pertaining to at least one adjacent image point P(i-k,j-p); and (b$_1$) upon the comparison in step (a) revealing a level difference between signals S(i,j) and S(i-k,j-p) whose absolute value does not exceed a predetermined threshold, using said luminance signal S(i,j) to control the brightness of image point P(i,j);

(b$_2$) upon the comparison in step (a) revealing a positive level difference between signals S(i,j) and S(i-k,j-p) exceeding said predetermined threshold, incrementing said signal S(i-k,j-p) by a corrective signal Sc of predetermined magnitude $+\Delta$LSM to produce a resulting signal Sc(i,j) = S(i-k,j-p) + Sc and using said resulting signal Sc(i,j) to control the brightness of image point P(i,j);

(b$_3$) upon the comparison in step (a) revealing a negative level difference between signals S(i,j) and S(i-k,j-p) whose absolute value exceeds said predetermined threshold, decrementing said signal S(i-k,j-p) by a corrective signal Sc of predetermined magnitude $-\Delta$LSm to produce a resulting signal Sc(i,j) = S(i-k,j-p) − |Sc| and using said resulting signal Sc(i,j) to control the brightness of image point P(i,j).

2. A process as defined in claim 1 wherein the magnitudes $+\Delta$LSM and $-\Delta$LSm of said corrective signal Sc are chosen in the vicinity of peaks of a histogram curve representing the frequency of occurrence of different brightness contrasts of adjacent image points.

3. A process as defined in claim 2 wherein said histogram curve is plotted from statistical measurements.

4. A process as defined in claim 2 wherein said picture is produced in recurrent frame sweeps, said histogram curve being quasi-instantaneously established by calculations based on the actual luminance signals of a frame.

5. A process as defined in claim 1, 2, 3 or 4 wherein the signal S(i-k,j-p) compared with signal S(i,j) in step (a) has a level calculated as the mean of the levels of a plurality of luminance signals pertaining to adjacent dots P(i-k,j-p) where k and p have any of the values +1, 0 and −1.

6. In a system for displaying a picture by the sweep of an electron beam in a succession of line scans across a receiving surface, the picture being composed of image points whose brightness is determined by intensity-control means in response to luminance signals emitted at discrete intervals by a source to produce a multiplicity of closely spaced luminous dots on said viewing surface, the combination therewith of a device for suppressing interferences in the form of spurious signals tending to impair the quality of the displayed picture, said device comprising:

comparison means having inputs connected to said source for receiving therefrom a first luminance signal S(i,j), pertaining to a given image point P(i,j) where i indicates the order number of a scanning line and j indicates the dot position in said line, together with a second luminance signal S(i-k,j-p) pertaining to at least one adjacent image point P(i-k,j-p), said comparison means generating a corrective signal Sc upon detecting a level difference between said first and second luminance signals with an absolute value exceeding a predetermined threshold, said corrective signal having a predetermined magnitude $+\Delta$LSM upon the level of said first luminance signal S(i,j) exceeding the level of said second luminance signal S(i-k,j-p) by more than said threshold but having a predetermined magnitude $-\Delta$LSm upon the level of said second luminance signal S(i-k,j-p) exceeding the level of said first luminance signal S(i,j) by more than said threshold;

adding means with inputs connected to said source and to said comparison means for algebraically summing said second luminance signal with said corrective signal to produce a resulting signal Sc(i,j) = S(i-k,j-p) ± |Sc|; and switching means controlled by said comparison means for feeding to said intensity-control means said first luminance signal S(i,j) in the absence of said corrective signal Sc and said resulting signal Sc(i,j) in the presence of said corrective signal Sc.

7. The combination defined in claim 6 wherein said comparison means is a differential amplifier receiving said first and second luminance signals for deriving therefrom a difference signal, a first threshold circuit connected to said differential amplifier for generating a corrective signal Sc of magnitude $+\Delta$LSM in response to a difference signal of one polarity whose absolute value surpasses a predetermined level, a second threshold circuit connected to said differential amplifier for generating a corrective signal Sc of magnitude $-\Delta$LSm in response to a difference signal of opposite polarity whose absolute value surpasses a predetermined level, and a summing amplifier with inputs connected to said threshold circuits for emitting the corrective signal so generated.

8. The combination defined in claim 7 wherein said comparison means further comprises a calculator having inputs connected in parallel with those of said differential amplifier for determining from a series of first and second luminance signals an optimum value for said corrective signal Sc, said threshold circuits having control inputs connected to said calculator for modifying said magnitudes $+\Delta$LSM and $-\Delta$LSm in accordance with said optimum value.

9. The combination defined in claim 6, 7 or 8 wherein said device further comprises arithmetic means for calculating the level of said second luminance signal as the mean of the levels of a plurality of luminance signals pertaining to adjacent dots P(i-k,j-p) where k and p have any of the values +1, 0 and −1.

* * * * *